US010917840B2

(12) United States Patent
Boss et al.

(10) Patent No.: US 10,917,840 B2
(45) Date of Patent: Feb. 9, 2021

(54) SELECTING A COMMUNICATION SERVICE PROVIDER ACCORDING TO CONSTRAINT CRITERIA

(71) Applicant: INTERNATIONAL BUSINESS MACHINES CORPORATION, Armonk, NY (US)

(72) Inventors: Gregory J. Boss, Saginaw, MI (US); Charles S. Lingafelt, Durham, NC (US); John E. Moore, Jr., Pflugerville, TX (US); Andrew R. Jones, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/130,340

(22) Filed: Sep. 13, 2018

(65) Prior Publication Data
US 2020/0092801 A1  Mar. 19, 2020

(51) Int. Cl.
*H04W 48/18* (2009.01)
*H04W 88/06* (2009.01)
*H04W 76/10* (2018.01)
*H04L 12/24* (2006.01)

(52) U.S. Cl.
CPC ........... *H04W 48/18* (2013.01); *H04W 76/10* (2018.02); *H04W 88/06* (2013.01); *H04L 41/5009* (2013.01)

(58) Field of Classification Search
None
See application file for complete search history.

(56) References Cited

U.S. PATENT DOCUMENTS

| 5,504,935 A | 4/1996 | Vercauteren |
| 5,966,658 A | 10/1999 | Kennedy et al. |
| 6,295,294 B1 | 9/2001 | Odlyzko |
| 8,811,969 B2 | 8/2014 | Shi et al. |
| 10,055,732 B1* | 8/2018 | Hecht ................ G06Q 20/4014 |
| 2006/0075467 A1* | 4/2006 | Sanda ................. H04L 63/0227 726/1 |
| 2008/0062934 A1 | 3/2008 | Zhao |
| 2009/0225677 A1* | 9/2009 | Williams ................ H04L 47/11 370/253 |
| 2011/0195700 A1* | 8/2011 | Kukuchka ............. H04W 60/00 455/422.1 |
| 2012/0030737 A1* | 2/2012 | Pagan ..................... G06F 21/44 726/5 |
| 2013/0125226 A1* | 5/2013 | Shah .................... H04L 63/0815 726/7 |
| 2016/0044537 A1* | 2/2016 | Macias ................. H04W 48/12 370/236 |
| 2019/0179725 A1* | 6/2019 | Mital .................... H04L 43/045 |

FOREIGN PATENT DOCUMENTS

WO   2017021787 A1   2/2017

\* cited by examiner

*Primary Examiner* — Gerald A Smarth
(74) *Attorney, Agent, or Firm* — Griffiths & Seaton PLLC (57) ABSTRACT

Embodiments for selecting a communication service provider by a processor. Communication requirements for one or more applications of a user equipment (UE) may be analyzed to convey information over a communication network. A communication service provider may be selected according to a level of matching both the communication requirements and one or more user selection criteria.

20 Claims, 6 Drawing Sheets

SELECTING A COMMUNICATION SERVICE PROVIDER ACCORDING TO CONSTRAINT CRITERIA

BACKGROUND OF THE INVENTION

Field of the Invention

The present invention relates in general to computing systems, and more particularly to, various embodiments for selecting a communication service provider in a communication network using a computing processor.

Description of the Related Art

In today's society, consumers, businesspersons, educators, and others use various computing systems in a variety of settings. Current network and communications technologies, such as machine-to-machine (M2M) technologies and the Internet, allow devices to communicate more directly with each other using wired and wireless communications systems. For example, the Internet provides for a system of interconnected computers and computer networks that use a standard Internet protocol suite (e.g., the Transmission Control Protocol (TCP) and Internet Protocol (IP)) to communicate with each other. Moreover, wireless mobile communication technology has enjoyed substantial growth in recent years using uses various standards and protocols to transmit data between a node (e.g., a transmission station) and a wireless device (e.g., a mobile device or "user equipment").

SUMMARY OF THE INVENTION

Various embodiments for selecting a communication service provider in a communication network by a processor, are provided. In one embodiment, by way of example only, a method for selecting a communication service provider, again by a processor, is provided. Communication requirements for one or more applications of a user equipment (UE) may be analyzed to convey information over a communication network. A communication service provider may be selected according to a level of matching both the communication requirements and one or more user selection criteria.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Many types of user equipment "UE" (e.g., IoT devices such as smart phones, smart watches, etc.) have various means for communicating such as, for example, connecting to the internet. For example, these various means may be provided using standards and protocols such as, for example, using third generation partnership project (3GPP) long term evolution (LTE), General Packet Radio Service (GPRS), Universal Mobile Telecommunications System (UMTS), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi. As such, many service providers (e.g., communication carriers) provide wireless carrier networks in high-traffic zones for access (e.g., wireless access point or wireless-based Internet Service Providers (ISPs) to the internet for a UE. The various locations include hotels, airports, and increasingly in restaurants and coffee shops.

As the commercial communication provider industry matures, multiple communication providers may be simultaneous available to a service consumer. For example, wireless communication service providers may compete for new clients by offering a variety of services. Currently, the manner in which a UE selects which carrier network the UE should connect to is arbitrary and deterministic. For example, a UE may be configured to select the carrier network providing the most efficient and powerful wireless cellular signal ("cell signal"). Alternatively, a UE may have stored a "preferred roaming list" (PRL), which is a prioritized listing of communication systems (such as WWANs) that the UE may access. The PRL may instruct the UE to connect to particular roaming carriers, particularly "roaming partners" with whom the service provider has a cost-saving roaming agreement, rather than using non-affiliated carriers, which may actually provide a stronger wireless communication signal. In other scenarios, a user may detect multiple Wi-Fi networks/signals and arbitrarily connect to a particular Wi-Fi network. However, the various means for selecting a carrier network do not take into consideration the communication requirements for one or more applications of the UE.

Accordingly, a need exists for selecting a service provider/carrier network according to the communication requirements for one or more applications of the UE. In one aspect, the present invention provides for a UE service consumer to select among alternate carriers (e.g., communication service providers) based on current provided service levels. It should be noted that "current provided service levels" are not the same as a published service level specifications from carriers. In one aspect, a published service level is what the service says it offers as a minimum standard such as, for example, download speeds of a minimum of 1.5 MB/Second Current provided service levels may be in excess of published service levels and dependent on conditions local to the UE and may be less than the published service levels. For example, current provided service level may be 2.2 MB/Second in this case (using the example above). Thus, the present invention provides for an endpoint UE to be enabled to select, in real-time or on demand, among a collection of available service providers to convey information (e.g., communication data) across a communication network.

In one aspect, a UE may quantify a communication requirements from an application of the UE and assess the communication capabilities of selectable carriers. For example, each application may have different characteristics such as, for example, a gaming application may require low latency but little bandwidth. On the other hand, an email application may have different attributes and characteristics such as, for example, requiring sufficient bandwidth for communicating data without any need for low latency. If a user is using a media service provider application on the UE for watching/streaming video data, the media service provider application may have attributes and characteristics requiring large/high bandwidth (e.g., the application needs to maintain at least 300 KB/Second (Kilobyte per second)) without any need for low latency since a buffer is used to fill a cache for a smooth playback.

Thus, the service provider/carrier network may be selected for communication for a selected application based on user established criteria (e.g., user selected rules, policies, etc.). The quantification of communication requirements may be provided by a user of the UE and/or an application associated with the UE as a specification. For example, the communication requirements may require a throughput of more than 100 megabytes ("MB") per second ("sec"), a latency of less than 100 milliseconds ("ms"), jitter of less than 10 ms, a minimum packet size of 1500 bytes, a maximum packet size of 1000 bytes, or deduced from point of view of end user device (e.g., a perceived performance need from a user's point of view where the user may perceived the system, for example, should respond more quickly/faster), based on assessment of prior activity.

The technical specification/communication requirements may be translated to more application specific requirements or natural language using a natural language processing ("NLP") operation (e.g. ability to transmit selected photos in certain period of time, ability to stream video, etc.). Capabilities of each service provided by a service provider/carrier network may be determined and/or assessed by testing a communication link at the time of the communication request and/or deduced from point of view of end user device, based on assessment of prior activity. The user selected criteria (e.g., service provider selection rules) may be defined as one criteria or a set of criteria. For example, the user selected criteria may be defined as selecting a lowest cost (e.g., financial) service provider matching the application requirement.

Alternatively, the user selected criteria rule may include multiple criteria/rules such as, for example, requiring both the lowest cost (e.g., financial) service provider matching the requirement and also a required minimum usage of a carrier (which may cause selection of a service provider that may not be the least costly but is the least costly that provides the requirement of the minimum usage of the carrier). Thus, the present invention provides for increasing service provider selection capacity and communication efficiency while simultaneously enable users to decrease financial costs.

In an additional aspect, various embodiments are provided for selecting a communication service provider. Communication requirements for one or more applications of a UE may be analyzed to convey information over a communication network. A communication service provider may be selected according to a level of matching both the communication requirements and one or more user selection criteria.

In one aspect, a plurality of mixed types of IoT sensor devices in an IoT network, which may include temperature sensors, air-quality and allergen sensors, gas sensors, and/or cameras, may interpret, detect, and correlate emotion, facial recognition and expression, biological data, gestures so as to determine a degree or level of satisfaction (which may be a range of values). A root cause analysis may be performed to determine a root cause that may link the collection of data to one or more of a plurality of satisfaction factors and levels in a knowledge domain describing the plurality of satisfaction factors and levels in a service based industry. That is, the root cause may identify both a level or degree of satisfaction of the customer with the service while also identifying level or degree of dissatisfaction of the customer with the service. Thus, the use of mixed IoT devices improves the personalization and customer experience for various entities, such as an individual, group of persons, and/or an organization.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
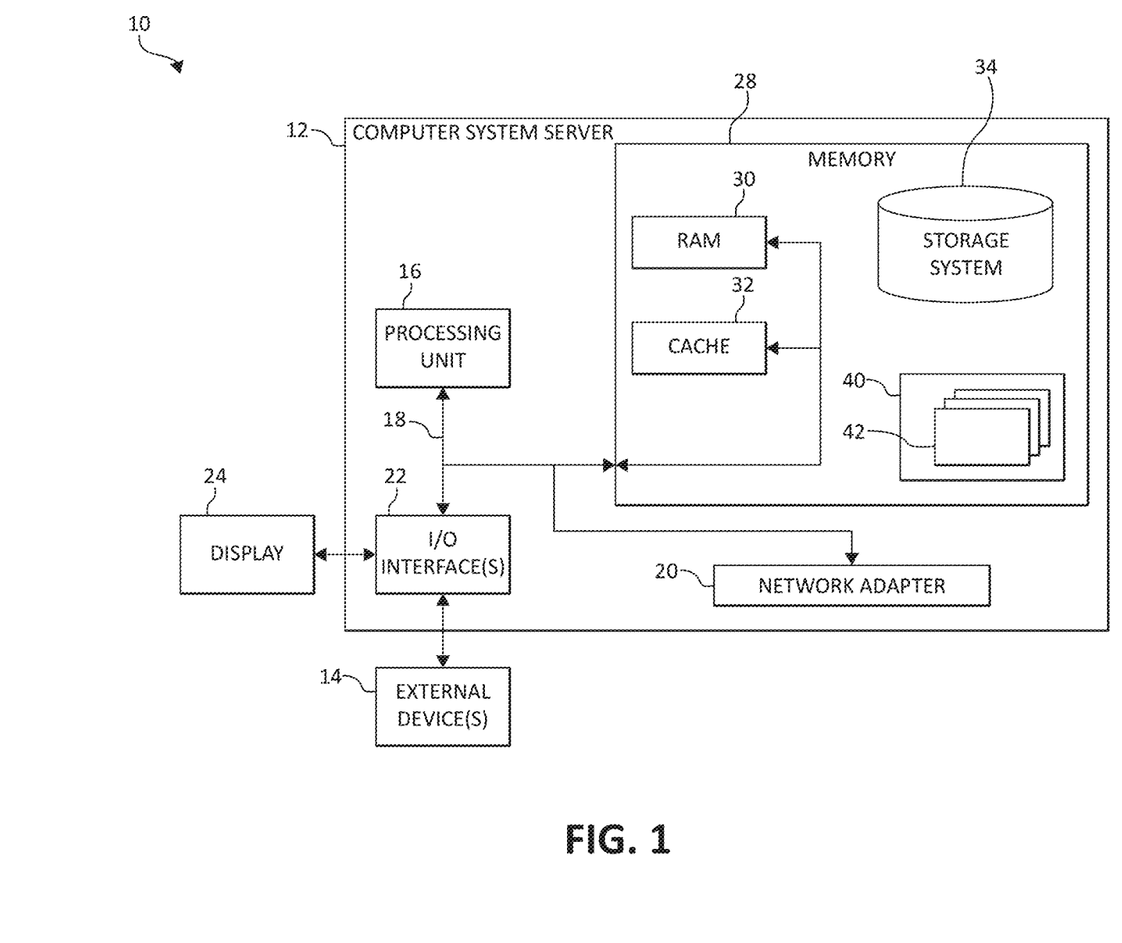
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
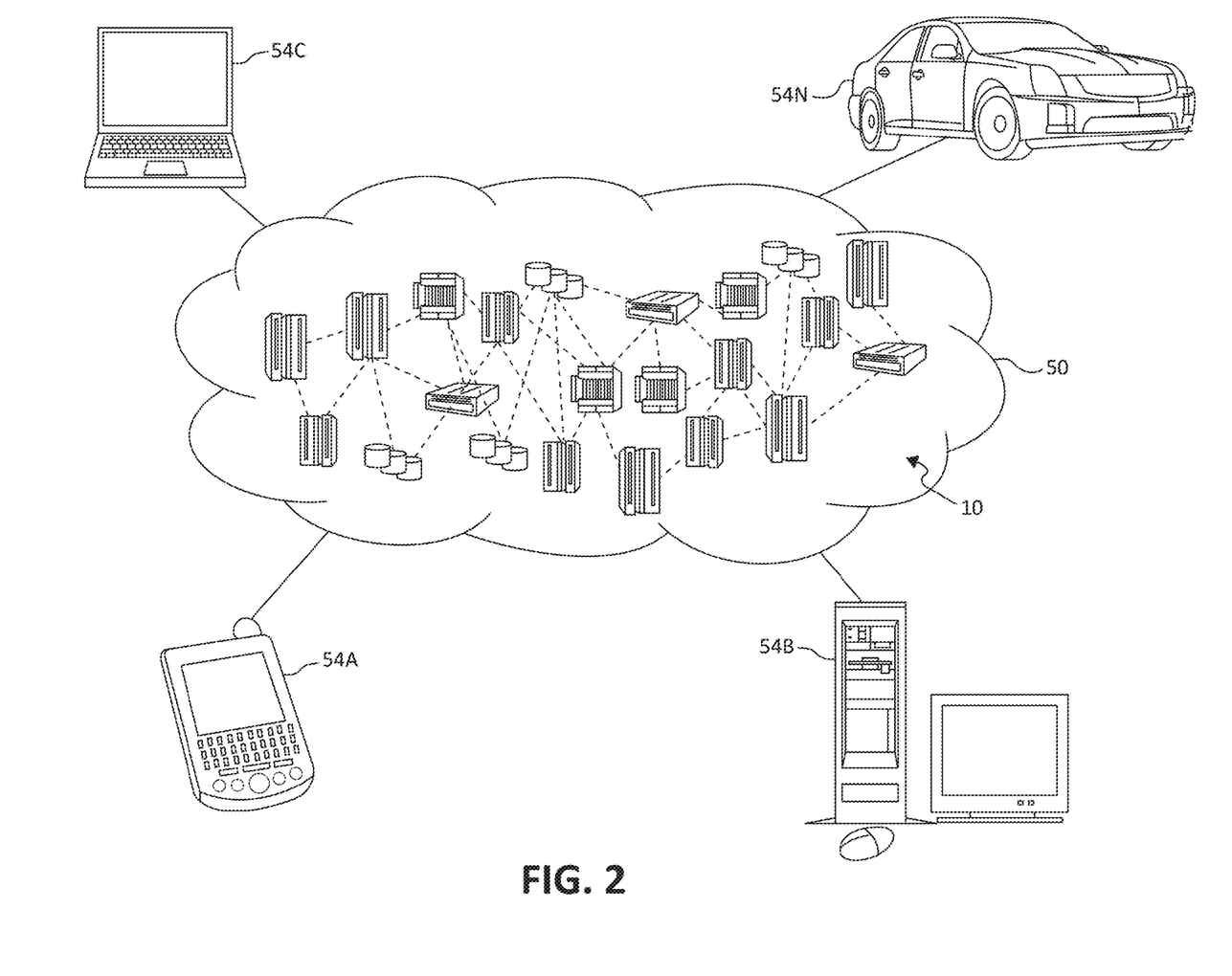
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
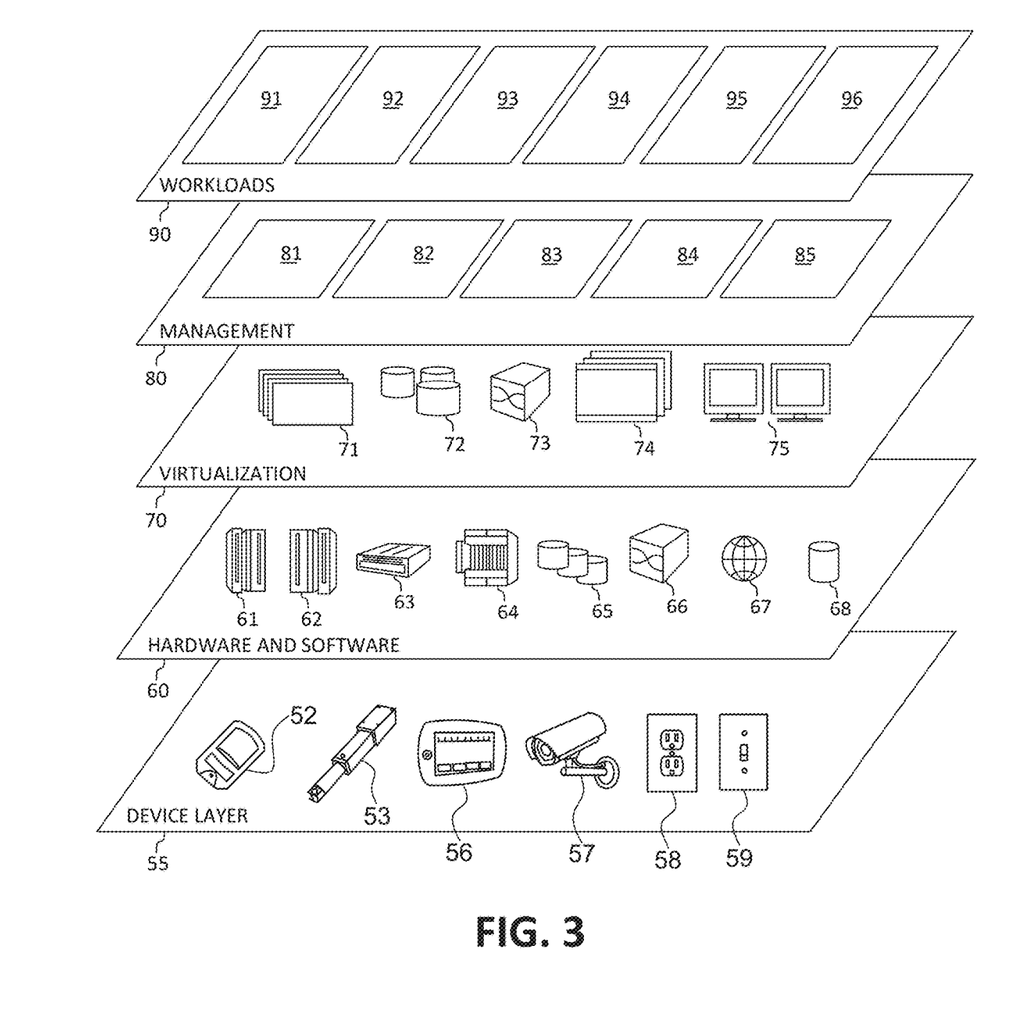
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides user verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for selecting a communication service provider. In addition, workloads and functions 96 for selecting a communication service provider may include such operations as data analysis (including data collection and processing from various environmental sensors), communication analysis, communication provider features and functionality analysis, and/or other functions relating to wireless communication. One of ordinary skill in the art will appreciate that the workloads and functions 96 for selecting a communication service provider may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
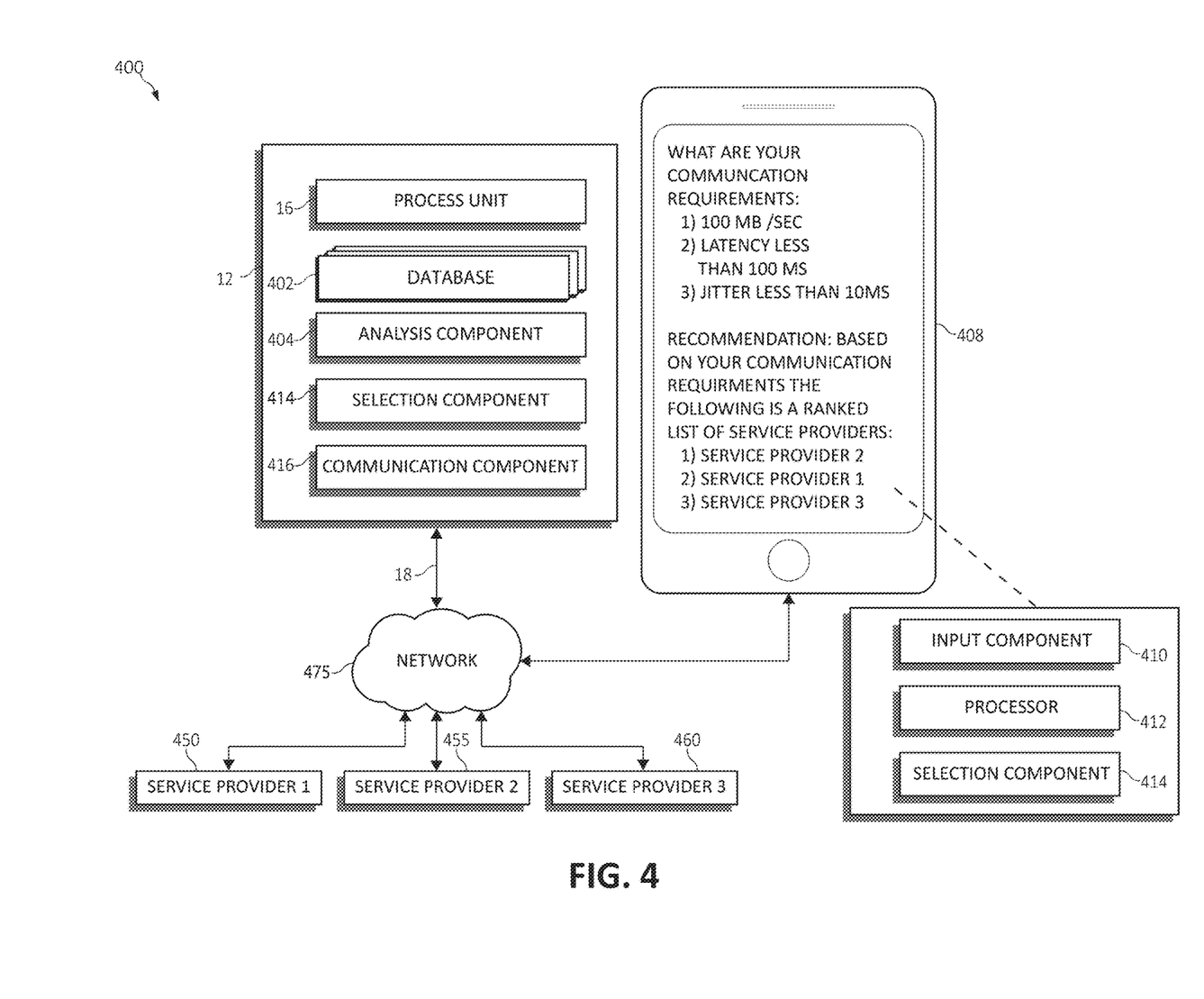
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4.

Computer system/server 12 is again shown, which may incorporate processor 16 to perform various computational, data processing and other functionality in accordance with various aspects of the present invention. A database 402 of application attributes/characteristics (e.g., a knowledge domain or ontology associated with application requirements, attributes, and/or characteristics) is shown, along with an analysis component 404, a selection component 414, and a communication component 416.

That is, application attributes/characteristics may be received or collected from each application associated with a UE such as, for example, computing device 408 and stored/maintained in database 402. The application attributes/characteristics may also be learned via a machine learning operation using the analysis component 404 in relation to communication services provided by one or more service providers such as, for example, service provider 450 ("service provider 1"), service provider 455 ("service provider 2"), and/or service provider 460 ("service provider 3"). The application attributes/characteristics may also be stored on the computing device 408 (in addition to database 402), which may be associated with the central server, the cloud computing network, the local area network server, and/or the computing system of the IoT devices including an image capturing device.

FIG. 4's components 400 as shown may also include the computing device 408. In one aspect, the computing device 408 may be a smartphone, a tablet, computers, handheld devices, an internet of things (IoT) device, and the like. The computing device 408 may be connected via communications channels (e.g., bus 18) through the wireless network 475 to the computer system/server 12 as shown. In one exemplary embodiment, the computing device 408 may connect through the wireless network 475 through the Internet to the computer system/server 12 to provide, send and/or receive information and/or instructions to and/or from the computer system/server 12. The computing device 408 may also connect through wireless network 475 through the Internet that may be provided by one or more service providers such as, for example, service provider 1, service provider 2, and/or service provider 3. It should be noted that computer system/server 12 may be external to computing device 408 (e.g., provided via cloud computing) and/or may be installed internally on computing device 408.

The computing device 408 may incorporate additional functional components 400 such as, for example, the depicted input component 410, processor 412, and the selection component 414 (e.g., service provider/carrier network component). Here again, the use of an input component 410 and selection component 414 are merely for illustrative convenience as a variety of functional components 400 may be integrated into the computing device 408 to accomplish specific functionality to further the mechanisms of the illustrated embodiments. The computing device 408 may provide an interactive graphical user interface (GUI) 420.

The analysis component 404 may analyze communication requirements for one or more applications of a user equipment (UE) to convey information over a communication network. The selection component 414 select one of a plurality of communication service providers (e.g., service provider 1, 2, and/or 3) matching both the communication requirements and one or more user selection criteria. Each of the plurality of communication service providers (e.g., service provider 1, 2, and/or 3) capabilities may be tested and/or assessed using real-time testing of a communication link for the communication requirements. Also, each of the plurality of communication service providers capabilities may be assessed according to historical data.

The selection component 414 may select one of the plurality of communication service providers matching the communication requirements below a cost threshold. Also, the analysis component 404 may also define and/or analyze the one or more user selection criteria to include a cost threshold and one or more required carrier capabilities. A cost threshold may be defined to be included in the one or more user selection criteria. The selection component 414 may also rank each of the plurality of communication service providers according to the one or more user selection criteria. For example, if a selected application of a UE is a media streaming application, the selection component 414 may rank the service provider 2 as being first (e.g., top rated, top ranked, best, optimal, and/or having a highest ranking score) that is a carrier network that matches both the communication requirements and one or more user selection criteria. Service provider 1 may be ranked second behind service provider 2, and above service provider 3.

The communication component 416, in association with the selection component 414, may communicate and/or connect to the one or more service providers upon selecting one of the plurality of communication service providers (e.g., service provider 1, service provider 2, and/or service provider according to a level of matching both the communication requirements and one or more user selection criteria.

In view of the foregoing, consider the following operations to determine an optimal network selection according to user selected/defined criteria. For example, in a preparation phrase, a query may be issued to one or more applications executing on a UE (including application allowed to execute in the background of the UE). The one or more applications, executing on the UE, may define "ideal" or optimal communication networks characteristics or attributes for maximizing communication efficiency for the application (e.g., a media service may define a requirement for a bandwidth of "X" and a latency of "Y," while a gaming application may r define a requirement for a bandwidth of "A" and a latency of "B."). In one aspect, an administrator designing the application may define the optimal communication networks characteristics or attributes and publish those optimal communication networks characteristics or attributes upon downloading the application on the UE (e.g., the UE may read the published optimal communication networks characteristics or attributes at the time of installing the application). It should be noted that as used herein, each application may have one or more application requirement profiles that may include minimum/maximum required communication network requirements and/or preferred communication network requirements.

Also, depending on how an application is used, the communication network requirements may alter, change, or update (e.g., reading social media news/posts in a social media application may require little bandwidth but posting a video using the social media application requires additional bandwidth). Thus, a communication network may be dynamically selected (in real-time) by attempting to accommodate each of the application requirement profiles applications that may be executing on the UE. In an additional aspect, the UE may switch carrier networks (e.g., back and forth switching) as various applications being executed on the UE vary and/or change.

Thus, each of the communication network requirement attributes may be analyzed and a communication service provider may be selected based on the communication service provider matching both the communication network requirement attributes and one or more user selection constraints/criteria (e.g., a least costly communication network, accomplishing a goal within a selected time frame such as, for example, downloading a video within a limited amount of time prior to boarding an airplane while at an airport). The user constraints/criteria may be defined by the user. In this way, the operation for selecting a communication service provider may be continuously executed (in real-time) to identify similar or different communication service providers according to different applications executing on the UE, communication network requirement attributes, and/or user selection constraints/criteria. For example, after downloading a video using carrier network "X", the UE (e.g., operating software "OS" of the UE) may switch to carrier network "Y" while reading email using an email application.

Thus, in the preparation phase, the application may provide/describe one or more communication requirements. The application's communication requirement may be provided as a specification and/or as a measure of historical usage for specific communication requirements.

In an additional aspect, a UE may provide information as to how to assess a communication carrier. Current testing of a communication link may be performed for assessment of historical communication link behavior. Also, the UE may provide/define one or more user selection criteria/rules for selecting a service provider (e.g., minimize cost, minimize certain carrier usage, select if current period usage less than).

Next, in an operation phase, communication requirements may be analyzed for one or more applications of a user equipment (UE) to convey information over a communication network and one of a plurality of communication service providers matching both the communication requirements and one or more user selection criteria may be selected, as indicated in the following pseudo code:

Start:
If application request use of communications subsystem then (does the app require communication);
If app communication requirement=specification then (what are the communication requirements),
obtain from user (user defined) or from application itself the communication requirements; else,
obtain calculated communication requirements from historical data (look at historical data to assume communication requirement if not obtain from app) (for each application in operation) for each eligible carrier (Bluetooth®, LTE, Wi-Fi)
if carrier capability determination=current
then conduct test of carrier capabilities,
obtain and evaluation test results (put in table) and publish capabilities, and
request attributes
else,
calculate carrier capabilities from historical data end for loop,
For carriers with capability>requirements
create ranked order of carriers based on rule selection criteria end for select top ranked carrier,
and
convey the applications data onto the carrier
end.

It should be note that communications requirements may be defined as one of the following attributes: throughput, latency, jitter, minimum packet size, maximum packet size, signaling protocol, data protocol, or other defined communication protocols, standards, or attributes. Also, the amount of historical data to use for determination of communication requirements may be based on user discretion and/or availability. Also, determining the communications requirements may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
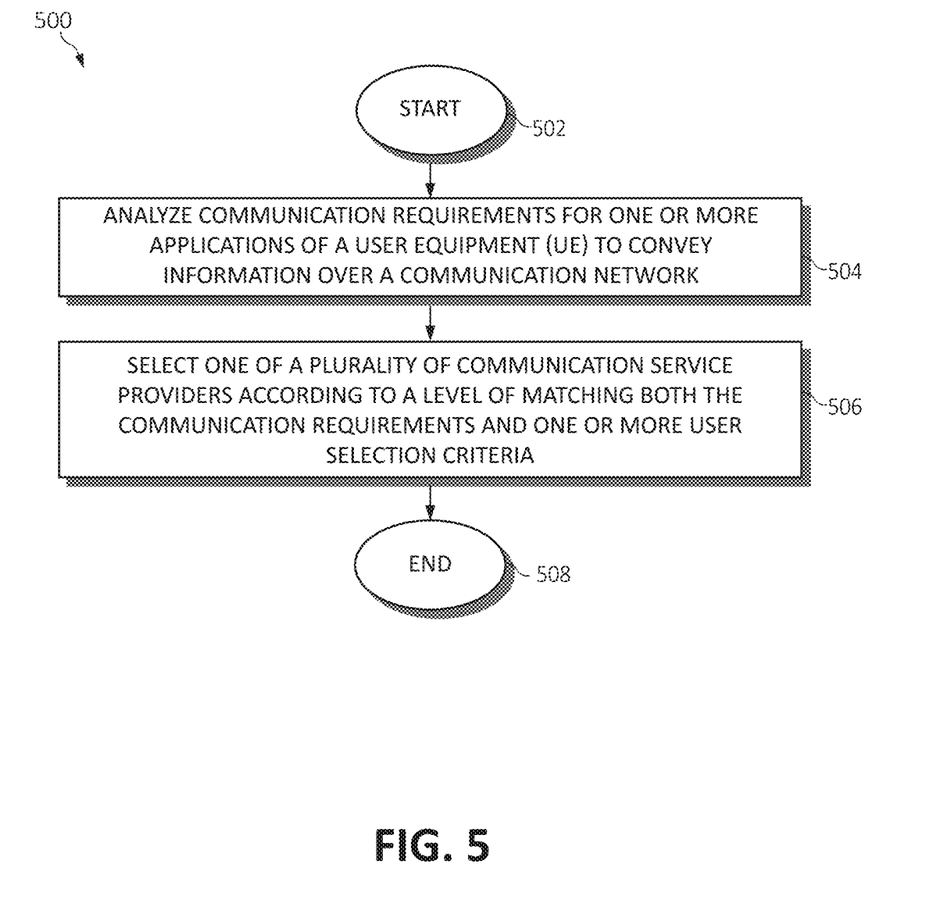
FIG. 5 is a flowchart diagram depicting an exemplary method for selecting a communication service provider in an internet of things (IoT) network environment in which aspects of the present invention may be implemented.

Turning now to FIG. 5, a method 500 for selecting a communication service provider in communications network by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

Communication requirements for one or more applications of a user equipment (UE) may be analyzed to convey information over a communication network, as in block 504.

A communication service provider may be selected according to a level of matching both the communication requirements and one or more user selection criteria, as in block 506. The functionality 500 may end, as in block 508.

Figure 6:
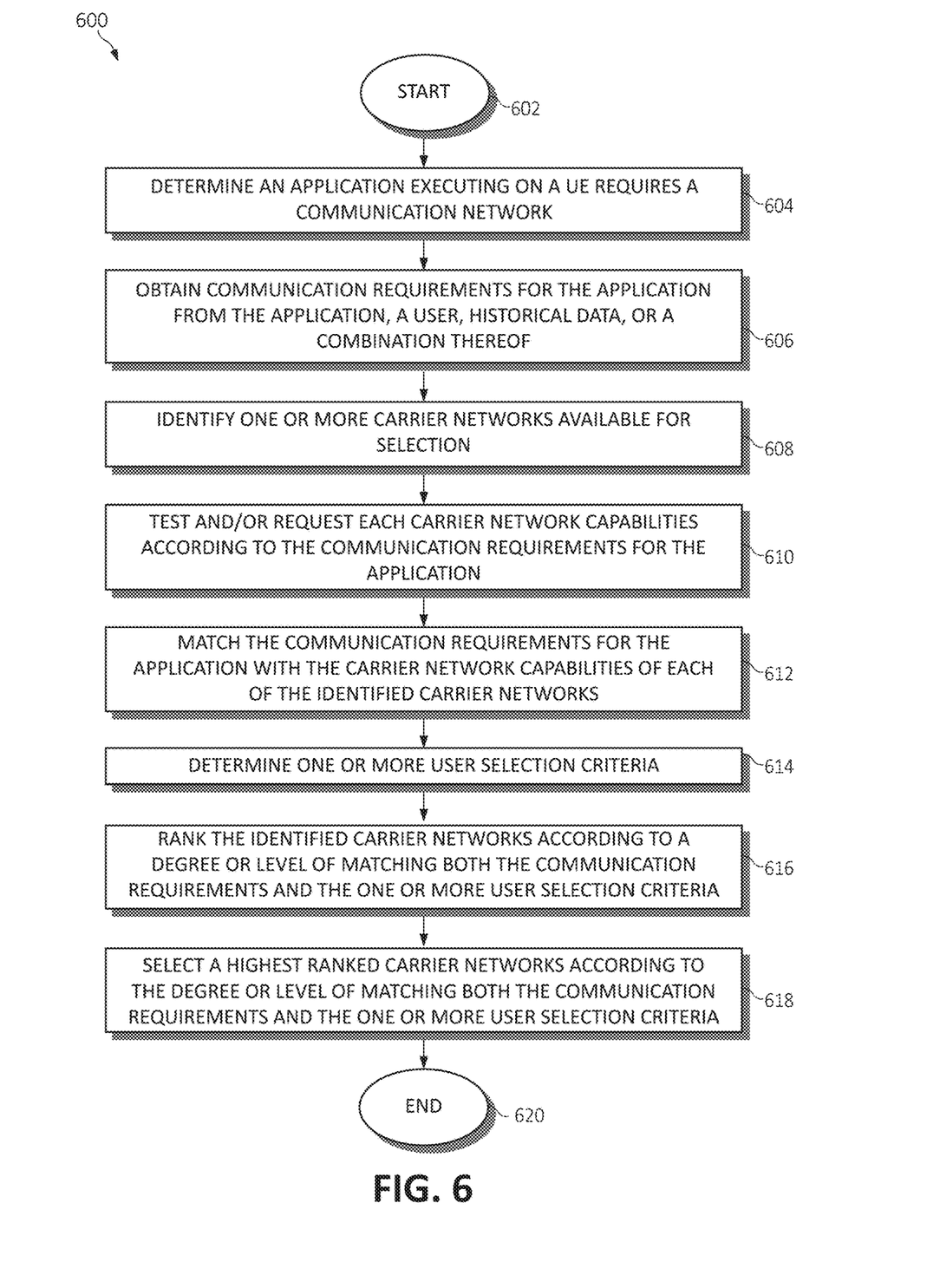
FIG. 6 is a flowchart diagram depicting an exemplary method for selecting a communication service provider in an internet of things (IoT) network environment in which aspects of the present invention may be implemented.

Turning now to FIG. 6, a method 600 for selecting a communication service provider in an IoT network by a processor is depicted, in which various aspects of the illustrated embodiments may be implemented. That is, FIG. 6 is a flowchart of an additional example method 600 for selecting a communication service provider in a wireless communication network according to an example of the present invention. The functionality 600 may be implemented as a method executed as instructions on a machine, where the instructions are included on at least one computer readable medium or one non-transitory machine-readable storage medium. The functionality 600 may start in block 602.

An operation may be performed to determine that an application executing on a UE requires a communication network, as in block 604. Communication requirements (e.g., minimum/maximum carrier network requirements, acceptable/preferred carrier network requirements, etc.) for the application may be obtained from the application, a user, historical data, or a combination thereof, as in block 606. One or more carrier networks available for selection may be identified, as in block 608. Capabilities of each carrier network may be tested and/or requested from the carrier network, as in block 610. The communication requirements for the application may be matched with the carrier network capabilities of each of the identified carrier network, as in block 612. One or more user selection criteria may be determined (if any), as in block 614.

The identified carrier networks may be ranked according to a degree or level of matching both the communication requirements and the one or more user selection criteria, as in block 616. The ranking may be according to a weighted numerical value, ranked according to a defined range, ranked according to a percentage value, or according to one or more defined thresholds to identify the degree or level of the matching. A highest ranked carrier network (as compared with the other identified carrier networks) may be selected according to the degree or level of matching both the communication requirements and the one or more user selection criteria, as in block 618. The functionality 600 may end, as in block 620.

In one aspect, in conjunction with and/or as part of at least one block of FIGS. 5 and/or 6, the operations of methods 500 and/or 600 may include each of the following. The operations of 500 and/or 600 may include accessing each of the plurality of communication service providers capabilities using real-time testing of a communication link for the communication requirements, and/or accessing each of the plurality of communication service providers capabilities according to historical data. The operations of 500 and/or 600 may select one of the plurality of communication service providers matching the communication requirements below a cost threshold. The one or more user selection criteria may be defined to include a cost threshold and one or more required carrier capabilities. Also, a cost threshold may be defined to be included in the one or more user selection criteria. The operations of 500 and/or 600 may rank each of the plurality of communication service providers according to the one or more user selection criteria, the communication requirements, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for selecting a communication service provider by a processor, comprising:
    analyzing communication requirements for one or more applications of a user equipment (UE) to convey information over a communication network; and
    selecting one of a plurality of communication service providers according to a level of matching both the communication requirements and one or more user selection criteria notwithstanding whether the selected one of the plurality of communication service providers is prioritized on a preferred list of communication service providers of the UE.

2. The method of claim 1, further including accessing each of the plurality of communication service providers capabilities using real-time testing of a communication link for the communication requirements.

3. The method of claim 1, further including accessing each of the plurality of communication service providers capabilities according to historical data.

4. The method of claim 1, further including selecting the one of the plurality of communication service providers matching the communication requirements and the one or more user selection criteria below a cost threshold.

5. The method of claim 1, further including defining the one or more user selection criteria to include a cost threshold and one or more required carrier capabilities.

6. The method of claim 1, further including defining a cost threshold to be included in the one or more user selection criteria.

7. The method of claim 1, further including ranking each of the plurality of communication service providers according to the one or more user selection criteria.

8. A system selecting a communication service provider, comprising:
    one or more computers with executable instructions that when executed cause the system to:
        analyze communication requirements for one or more applications of a user equipment (UE) to convey information over a communication network; and
        select one of a plurality of communication service providers according to a level of matching both the communication requirements and one or more user selection criteria notwithstanding whether the selected one of the plurality of communication service providers is prioritized on a preferred list of communication service providers of the UE.

9. The system of claim 8, wherein the executable instructions further access each of the plurality of communication service providers capabilities using real-time testing of a communication link for the communication requirements.

10. The system of claim 8, wherein the executable instructions further access each of the plurality of communication service providers capabilities according to historical data.

11. The system of claim 8, wherein the executable instructions further select the one of the plurality of communication service providers matching the communication requirements and the one or more user selection criteria below a cost threshold.

12. The system of claim 8, wherein the executable instructions further define the one or more user selection criteria to include a cost threshold and one or more required carrier capabilities.

13. The system of claim 8, wherein the executable instructions further define a cost threshold to be included in the one or more user selection criteria.

14. The system of claim 8, wherein the executable instructions further rank each of the plurality of communication service providers according to the one or more user selection criteria.

15. A computer program product for selecting a communication service provider in an internet of things (IoT) computing environment by at least a portion of a processor, the computer program product comprising a non-transitory computer-readable storage medium having computer-readable program code portions stored therein, the computer-readable program code portions comprising:

an executable portion that analyzes communication requirements for one or more applications of a user equipment (UE) to convey information over a communication network; and an executable portion that selects one of a plurality of communication service providers according to a level of matching both the communication requirements and one or more user selection criteria notwithstanding whether the selected one of the plurality of communication service providers is prioritized on a preferred list of communication service providers of the UE.

16. The computer program product of claim 15, further including an executable portion that:

accesses each of the plurality of communication service providers capabilities using real-time testing of a communication link for the communication requirements; or accesses each of the plurality of communication service providers capabilities according to historical data.

17. The computer program product of claim 15, further including an executable portion that selects the one of the plurality of communication service providers matching the communication requirements and the one or more user selection criteria below a cost threshold.

18. The computer program product of claim 15, further including an executable portion that defines the one or more user selection criteria to include a cost threshold and one or more required carrier capabilities.

19. The computer program product of claim 15, further including an executable portion that defines a cost threshold to be included in the one or more user selection criteria.

20. The computer program product of claim 15, further including an executable portion that ranks each of the plurality of communication service providers according to the one or more user selection criteria.

\* \* \* \* \*